United States Patent [19]

Spannhake

[11] 3,927,346

[45] Dec. 16, 1975

[54] SYSTEM FOR STABILIZATION OF WORKING POINT IN PICTURE TUBES

[75] Inventor: Dieter Spannhake, Darmstadt, Germany

[73] Assignee: Robert Bosch Fernsehanlagen GmbH, Darmstadt, Germany

[22] Filed: Oct. 5, 1973

[21] Appl. No.: 403,987

[30] Foreign Application Priority Data

Oct. 11, 1972 Germany .......................... 2249703

[52] U.S. Cl. ...................... 315/30; 328/267; 323/8; 315/379; 358/74

[51] Int. Cl.² .......................................... H01J 29/52

[58] Field of Search .... 315/30, 13 CG, 31 TV, 381, 315/389, 379, 409, 410; 328/267; 323/8; 358/64, 65, 74

[56] References Cited

UNITED STATES PATENTS

| | | | |
|---|---|---|---|
| 3,059,140 | 10/1962 | Heuer | 315/13 CG |
| 3,247,418 | 4/1966 | Hansen et al. | 315/13 CG |
| 3,301,943 | 1/1967 | Hansen | 358/65 |
| 3,679,961 | 7/1972 | Hamilton | 323/8 |

*Primary Examiner*—Maynard R. Wilbur
*Assistant Examiner*—T. M. Blum
*Attorney, Agent, or Firm*—Littlepage, Quaintance, Murphy & Dobyns

[57] ABSTRACT

Minor deviations in color temperature, which occur because of changes in the power supplied to video amplifiers which supply the video signal to a color picture tube, are corrected by adjusting the supply voltage for the screen grids to effect a change by adjustment of the throughgrip of the screen grids. A control amplifier compares the screen-grid supply voltage, the power supply voltage and a reference voltage to control the screen-grid supply voltage.

6 Claims, 1 Drawing Figure

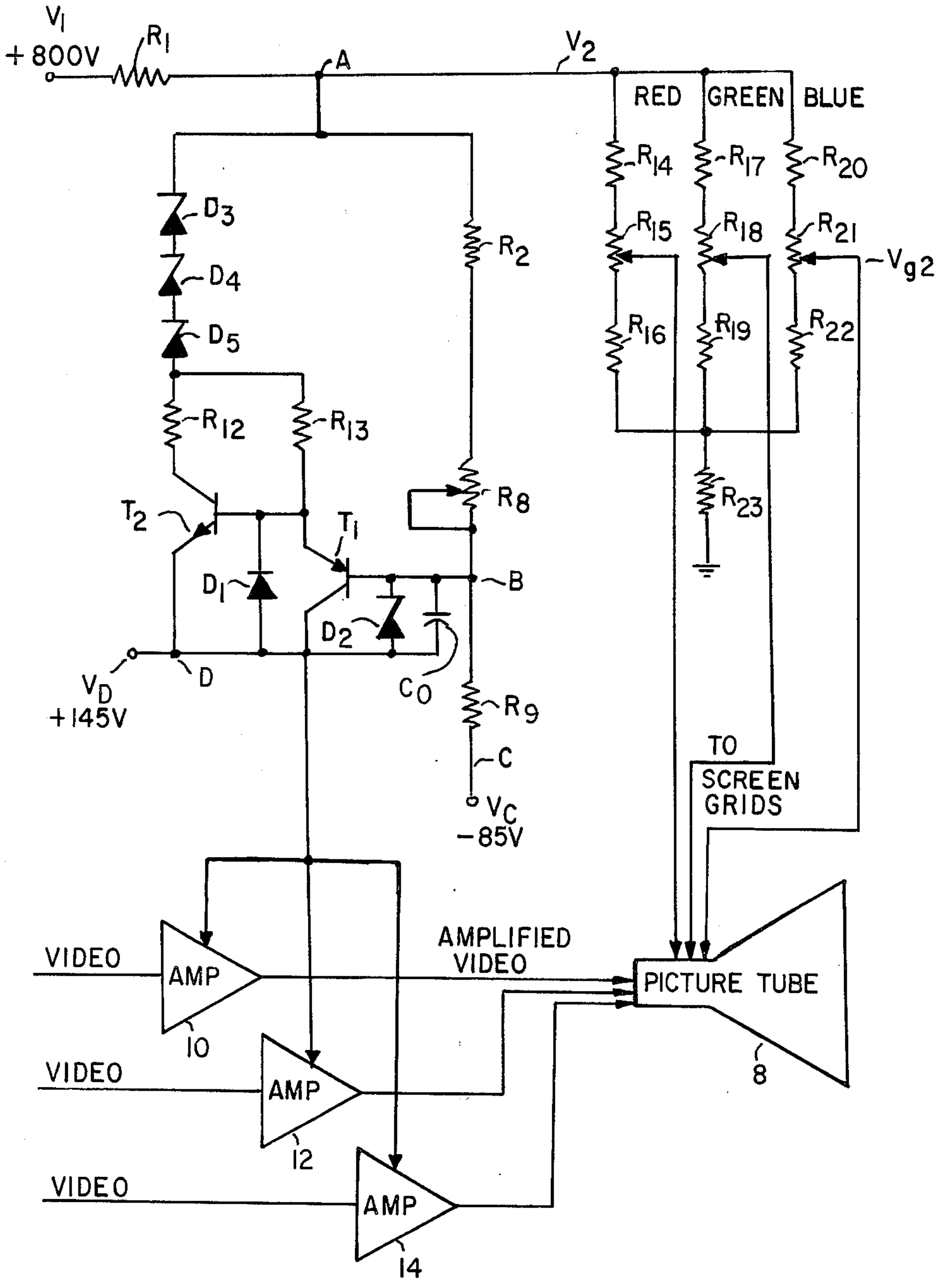
V1
+800V
R1
A
V2
RED
GREEN
BLUE
R14
R17
R20
R15
R18
R21
-Vg2
R16
R19
R22
R23
D3
D4
D5
R2
R12
R13
R8
T2
T1
B
D1
D2
VD
+145V
D
C0
R9
C
VC
-85V
TO
SCREEN
GRIDS
VIDEO
AMP
AMPLIFIED
VIDEO
PICTURE TUBE
10
VIDEO
AMP
12
8
VIDEO
AMP
14

SYSTEM FOR STABILIZATION OF WORKING POINT IN PICTURE TUBES

BACKGROUND OF THE INVENTION

This invention relates to a circuit for the stabilization of the working or operating point for the control system of cathode-ray tubes, especially color picture tubes. It is intended to achieve the greatest possible constancy of the working point so that the grey value on the luminous screen of the picture tube will retain a fixed value.

DESCRIPTION OF THE PRIOR ART

The working point of a picture tube can be influenced, on the one hand, by the cathode voltage $V_k$ and, on the other hand, by the Wehnelt voltage $V_g$ and the screen grid voltage $V_{g2}$. While the Wehnelt electrode and the cathode generally are used for initial ray selection or control, the screen grids of the three systems, in the case of color picture tubes, are used in order to adjust the operating point of the picture tube for a grey value corresponding to the desired color temperature. This adjustment is generally accomplished through light measurement on the picture screen.

The "throughgrip" (reciprocal of screen amplification factor) on the screen grid upon the cathode is about 30% in the case of color picture tubes. In order to keep the grey adjustment as unchanged as possible, the voltage supply of the screen grids is taken from a common source. In this way, a small inconstancy in the source has an almost uniform effect on all three screen grid voltages, as a result of which the adjusted grey value and thus also the color temperature value can be maintained with only minor remaining deviations.

If however several receivers are set up, thus adjusted, next to each other or over each other, then the remaining color differences nevertheless do become noticeable in a very disturbing manner. Such joint operation of several receivers takes place especially in studios where this equipment is used for judging the received and transmitted pictures.

Such color differences can be clearly recognized even if the constancy of the source for the screen grid voltages is between 1 and 2%. Furthermore, in any adjustments of the picture width or the high-tension voltage, it is always necessary to make a followup adjustment of the $V_{g2}$ voltages because the common source of these voltages—that is, the booster voltage or a voltage obtained through rectification of the line flyback pulse of the horizontal terminal phase—does not remain constant.

Investigations have revealed that color contaminations or adulterations in equipment standing next to each other become no longer significant only when we reach a stability of 2% for the adjustment of the screen grid voltages. This stability is not achieved in the conventional circuits.

The corresponding stability of the direct voltage supply for the Wehnelt cathode is about 1%. If, for example, cathode approach control is selected with a high-tension voltage of the video amplifier of 150 v, then the change of this voltage compared to the Wehnelt must not be more than 0.15 v if there are to be no color contaminations when we superpose a grey picture.

If voltage instabilities greater than those specified are obtained, then the color tone shifts can be clearly recognized in darkened rooms.

SUMMARY OF THE INVENTION

To achieve a particularly high long-time constancy in the adjusted grey value in color TV receivers, where the common high-tension voltage (overvoltage) of the screen grid adjustments is stabilized through a control comparison, one can proceed as follows according to the invention. The common high-tension voltage of the video terminal amplifiers is also included in the control comparison. Changes in this voltage are used for the alteration of the stabilized high-tension voltage of the screen grid adjustments to such an extent that the change in the common high-tension voltage of the video terminal amplifiers, which control the cathodes of one color picture tube, are compensated through the effect of the screen grid throughgrip.

In this way, a high constancy can be achieved in the grey value for a color TV tube which has been adjusted, so that, in a group of equalized or adjusted color receivers, the same color reproduction is obtained when they are turned on after a longer interval of time. This advantage springs from the fact that irregularities can be adjusted or compensated if they act upon the high-tension voltage of the video amplifiers and also if they act upon the high-tension voltage of the screen grids.

DESCRIPTION OF THE PREFERRED EMBODIMENT

Further details of the invention can be seen from the following description in which reference will be made to the circuit illustrated in the FIGURE. In this circuit, $V_2$ is the positive high-tension voltage of the screen grids of picture tube 8, $V_D$ is the high-tension voltage of the video amplifiers illustrated generally at 10, 12 and 14, $V_{g2}$ is a screen grid voltage which has been picked off the voltage dividers $R_{14}$ through $R_{22}$ of the screen grids, and $V_c$ is a negative reference voltage. A control amplifier is constituted by transistors $T_1$ and $T_2$ of the complementary type to whose bases are connected respectively in parallel, zener diode $D_2$ and diode $D_1$. At the input of the amplifier, a fraction of the voltage $V_1$ is scanned at point B of the voltage divider $R_2$, $R_8$, and $R_9$, and a shunt is formed through the collector circuit of the transistor $T_2$, and by means of the current of that shunt, the voltage $V_2$ is altered at the pickoff from the resistance $R_1$. The collector circuit of transistor $T_2$ is applied, with zener diodes $D_3$ to $D_5$, to a relatively low voltage compared to the emitter point D. The reference voltage $V_c$ of −85 v, which is applied at point C, is taken from a practically constant stabilization source, preferably a glow discharge lamp (not illustrated), whose value remains constant at magnitudes of less than 1%. Resistors $R_2$ and $R_9$ may each be made up of numerous precision resistors connected in series, if appropriate.

The common high-tension voltage for the screen grid adjustments from rheostats $R_{15}$ and $R_{18}$ can be maintained constant according to the principle of the parallel current regulator. The unregulated voltage $V_1$ is obtained directly from an auxiliary winding of the deflection and high-voltage transformer (not illustrated) through the rectification of the line flyback pulses. The stability of this voltage is already relatively good at 1%, but as an output voltage for the adjustment of the screen grid voltages, it is not good enough.

The output voltage $V_2$ is kept constant through the regulation of the voltage drop at $R_1$. The circuit used for this purpose, consisting of resistances $R_1$, $R_2$, $R_8$, $R_9$, $R_{12}$ and $R_{13}$, transistors $T_1$ and $T_2$, diodes $D_1$ to $D_5$, and capaciter $C_0$, works with a negative reference voltage at point C amounting to −85 v, and a positive voltage of +145 v at point D. This voltage $V_2$ is the common high-tension voltage of the three terminal video amplifiers for the control of the cathodes in color picture tubes. The video amplifiers themselves are not illustrated in the circuit.

With the help of the voltage divider, which is between points A and C in the circuit, the voltage change of the output voltage $V_2$ at point A can be divided in the ratio of $$a = \frac{R_9}{R_2+R_8+R_9}$$

and it is supplied to point B and thus to the base of transistor $T_1$. The transistor $T_1$ works as an emitter follower and controls the base of the transistor $T_2$. Because $T_1$ and $T_2$ are opposite conductivity types, there is a mutual compensation of the temperature-dependent base-emitter voltages of $T_1$ and $T_2$.

The emitter of $T_2$ is connected at point D to the low-ohmic voltage source of +145 v, the high-tension voltage for the operation of the terminal video amplifiers which control the cathodes. Because transistor $T_2$ works without inverse feedback, it suffices to have a very small voltage change at the base in order to draw, from point A, the current which will correct the output voltage $V_2$ due to a voltage drop at $R_1$. To protect the transistor $T_2$ against a too high collector voltages, zener diodes $D_3$ to $D_5$, with a voltage drop of 150 v, each, are connected between point A and resistance $R_{12}$.

The diodes $D_1$ and $D_2$ prevent the emitter sections $T_1$ and $T_2$ from being overloaded as the equipment is turned on. The condenser $C_0$ short-circuits capacitively inflowing alternating voltages. With the help of the potentiometer $R_8$ the relationship $$a = \frac{R_9}{R_2+R_8+R_9}$$

can be altered to adjust the output voltage.

The ratio of the voltages on the voltage divider is of essential significance to the invention. To achieve the effects according to the invention, the ratio of the voltages, expressed by the fraction $$\frac{V_D - V_C}{V_A - V_D}$$

which, according to the voltage divider ratio corresponding to the fraction $$b = \frac{R_9}{R_2+R_8}$$

is selected equal to the throughgrip of the screen grids upon the cathodes. By means of this voltage divider selection, a control or possibly a change of the common high-tension voltage for the terminal video amplifiers is obtained. The change of this high tension voltage acts directly upon the cathodes of the color reproduction tube. The circuit described now amplifies this amount of change by the factor of $1/D$ to the output voltage $V_2$ which is then used as high-tension voltage for the screen grid voltages. The change in the operating voltage for the terminal video amplifiers is thus compensated via the throughgrip of the picture tube. In the circuit illustrated, the resistances $R_{14}$ to $R_{23}$ form the voltage divider for the adjustments of the voltages $V_{g2}$, wherein $R_{15}$, $R_{18}$, and $R_{21}$ are potentiometers.

Keeping in mind that, due to the voltage divider on the screen grid, a lower voltage than $V_2$ is generated, then dimensioning of the circuit can be derived from the following mathematical derivation. When D is the throughgrip from $V_{g2}$ upon the cathode, then the following applies $$(1)\quad \Delta V_k = D \cdot \Delta V_{g2}$$

$$(2)\quad \frac{\Delta V_k}{\Delta V_2} = \frac{R_9}{(R_2+R_8+R_9)}$$

$$(3)\quad \Delta V_{g2} = \Delta V_2 \cdot \frac{V_{g2}}{V_2}$$

$$(4)\quad \Delta V_k = \Delta V_{g2} \cdot \frac{V_2}{V_{g2}} \cdot \frac{R_9}{(R_2+R_8+R_9)}$$

The fraction which is on the right side of equation (4) is so selected that it will be equal to the throughgrip $D$ of the color reproduction tube. Thus the following is obtained $$(5)\quad D = \frac{V_2}{V_{g2}} \cdot \frac{R_9}{(R_2+R_8+R_9)}$$

$$(6)\quad D \cdot V_{g2} = V_2 \cdot \frac{R_9}{(R_2+R_8+R_9)}$$

Considering the video high-tension voltage $V_{HT}$, it follows that:

$$(7)\quad D \cdot V_{g2} = V_2 \frac{(V_{HT} + |V_{Ref}|)}{V_2 + |V_{Ref}|}$$

and, as a good approximation $$(8)\quad V_{HT} + |V_{Ref}| \cong D \cdot V_{g2m}$$

whereby the magnitude $V_{g2m}$ is the mean value of $V_{g2}$.

I claim:

1. A system for stabilization of the working point of a picture tube including a cathode and a screen grid, comprising A. a video amplifier (10) powered from a high-tension direct voltage source ($V_D$) and amplifying a video signal for control of the cathode of a picture tube (8), B. an adjustable voltage divider ($R_{14}$–$R_{23}$) driven by a second direct voltage source ($V_2$) for providing a divided direct voltage ($V_{g2}$) for application to screen grids of the picture tube, and C. adjusting means ($T_1$,$T_2$) directly responsive to change in the magnitude of the voltages from the high-tension voltage source ($V_D$) and from the second voltage source ($V_2$) with respect to a reference voltage ($V_c$) for adjusting the direct voltage level of the second direct voltage source, whereby changes in the high-tension direct voltage source are compensated for by the effect on the picture tube of the change in throughgrip which results from adjustment of the second direct voltage source.

2. A system for stabilization of the working point of a picture tube including a cathode and a screen grid, comprising A. a video amplifier (10) powered from a high-tension voltage source ($V_D$) and amplifying a video signal for control of the cathode of a picture tube (8), B. an adjustable voltage divider ($R_{14}$–$R_{23}$) driven by a second voltage source ($V_2$) for providing a divided voltage ($V_{g2}$) for application to screen grids of the picture tube, and C. adjusting means ($T_1$,$T_2$) responsive to change in the magnitude of the voltages from the high-tension voltage source ($V_D$) and from the second voltage source ($V_2$) with respect to a reference voltage ($V_c$) for adjusting the voltage level at the second voltage source, whereby changes in the high-tension voltage source are compensated for by the effect on the picture tube of the change in throughgrip which results from adjustment of the second voltage source, wherein the adjusting means comprises a control amplifier having an input terminal and an output terminal, the output terminal being effectively tied to the second voltage source to effect a change in the magnitude of the second voltage, the input terminal being connected to the junction (B) between one end of a first resistance ($R_2 + R_8$) and one end of a second resistance ($R_9$), another end of the first resistance being connected to the second voltage source, and another end of the second resistance being connected to the reference voltage, wherein the ratio of the second resistance to the first resistance is substantially equal to the throughgrip of the picture tube.

3. A system according to claim 2 wherein the control amplifier comprises transistors of opposite conductivity type in cascade.

4. A system according to claim 3 wherein the base-emitter section of each transistor is poled in one direction, and a diode is bridged across the base-emitter terminals with its poles opposite to said one direction.

5. A system according to claim 2 wherein one of the first and second resistances comprises an adjustable resistance ($R_8$) for adjustment of the voltage at the junction (B).

6. A system for stabilization of the working point of a picture tube including a cathode and a screen grid, comprising A. a video amplifier (10) powered from a high-tension voltage source ($V_D$) and amplifying a video signal for control of the cathode of a picture tube (8), B. an adjustable voltage divider ($R_{14}$–$R_{23}$) driven by a second voltage source ($V_2$) for providing a divided voltage ($V_{g2}$) for application to screen grids of the picture tube, and C. adjusting means ($T_1$,$T_2$) responsive to change in the magnitude of the voltages from the high-tension voltage source ($V_D$) and from the second voltage source ($V_2$) with respect to a reference voltage ($V_c$) for adjusting the voltage level at the second voltage source, whereby changes in the high-tension voltage source are compensated for by the effect on the picture tube of the change in throughgrip which results from adjustment of the second voltage source, for use with color picture tubes wherein the second voltage source provides a common voltage for each of three screen grids and the high-tension voltage source provides a common high-tension voltage for three video amplifiers.

* * * * *